US005882091A

United States Patent [19]

Toda et al.

[11] Patent Number: 5,882,091

[45] Date of Patent: Mar. 16, 1999

[54] BRAKE PRESSURE CONTROL APPARATUS

[75] Inventors: Hiroshi Toda, Kariya; Michiharu Nishii, Toyota, both of Japan

[73] Assignee: Aisin Seiki Kabushiki Kaisha, Kariya, Japan

[21] Appl. No.: 755,744

[22] Filed: Nov. 22, 1996

[30] Foreign Application Priority Data

Nov. 24, 1995 [JP] Japan .................................... 7-306295

[51] Int. Cl.[6] ........................................................ B60T 8/34

[52] U.S. Cl. .................................... 303/113.2; 303/113.4; 303/116.2

[58] Field of Search ............................. 303/113.2, 115.4, 303/139, 144, 113.5, 116.1, 116.2, 10, 11

[56] References Cited

U.S. PATENT DOCUMENTS

| | | | |
|---|---|---|---|
| 5,531,514 | 7/1996 | Nishii et al. . | |
| 5,549,366 | 8/1996 | Toda et al. | 303/113.2 |
| 5,588,722 | 12/1996 | Noguchi | 303/115.4 X |

FOREIGN PATENT DOCUMENTS

| | | |
|---|---|---|
| 195 19 234 | 12/1995 | Germany . |
| 195 19 236 | 12/1995 | Germany . |
| 2-70561 | 3/1990 | Japan . |
| 5-507667 | 11/1993 | Japan . |

*Primary Examiner*—Lee W. Young
*Attorney, Agent, or Firm*—Burns, Doane, Swecker & Mathis, LLP

[57] ABSTRACT

A pressure control apparatus includes a first brake pressure control valve for controlling communication between a first wheel brake for applying a braking force to an driving wheel of a vehicle and a pressure generating chamber of a master cylinder and for controlling communication between the first wheel brake and a low back pressure reservoir, and a second brake pressure control valve for controlling communication between a second wheel brake for applying a braking force to a non-driving wheel of the vehicle and the pressure generating chamber and for controlling communication between the second wheel brake and the low back pressure reservoir. A pump draws brake fluid from the reservoir into the first wheel brake and into the second wheel brake through the second control valve. A valve is provided for controlling communication between the wheel brakes and the pressure generating chamber through check valves and for controlling communication between an inlet passage of the pump and the pressure generating chamber. A check valve for blocking fluid flow from the inlet passage of the pump into the reservoir is also provided.

9 Claims, 3 Drawing Sheets

SV1
SV2
SV3
SV4
SV5
SV6
SV7
SV8
FR
RL
RR
FL
Act
14A
14B
33A
33B
12a
12b
12c
22a
22b
22c
41a
41b
41c 10
11
12
12a
12b
12c
13
14A
14B
15
16
17
18
19
20
21
22
22a
22b
22c
23
24
25
26
27
28
29
30
31
32
33A
33B
34
35
36
37
38
39
40
41
41a
41b
41c
42
43
44
45
46
47
48
49
50
51
52
53
54
55
56
57
58
59
60
SV1
SV3
SV4
SV5
SV7
SV8
SV9
SV10
FR
RL
RR
FL
Act

SV11
SV1
SV2
SV3
SV12
SV14
SV5
SV6
SV7
SV13
FR
RL
RR
FL
Act
10
11
12
12a
12b
12c
13
14A
14B
15
16
17
18
19
20
21
22
22a
22b
22c
23
24
25
26
27
28
29
30
31
32
33A
33B
34
35
36
37
38
39
40
41
41a
41b
41c
42
43
44
45
46
47
48
49
50
51
52
53
54
55
56
57
58
59
60

BRAKE PRESSURE CONTROL APPARATUS

FIELD OF THE INVENTION

The present invention relates to a brake pressure control apparatus and more particularly to a brake pressure control apparatus which individually controls the brake pressure in first and second wheel brakes during actuation of the brake pedal and individually supplies and controls the brake pressure in the first and second wheel brakes during non-actuation of the brake pedal.

BACKGROUND OF THE INVENTION

A vehicular hydraulic brake system provided with a brake pressure control apparatus to perform anti-lock control in order to prevent road wheels from locking during brake actuation of a brake pedal and traction control in order to prevent the driving road wheels from spinning when a vehicle starts to move or increase speed is known and is disclosed in Japanese Patent Application Laid-Open No. HEI 5-507667.

An apparatus for controlling vehicle motion through use of a brake pressure control apparatus to restrain an excessive over-steer and an excessive under-steer which will occur during, for example, cornering by a braking force to one wheel or several wheels of the vehicle irrespective of depression of a brake pedal is also known and is disclosed in Japanese Patent Application Laid-Open No. HEI 2-70561.

The vehicular hydraulic brake system generally has two brake pressure circuits each of which includes two wheel brakes. The brake pressure control apparatus, which individually controls the brake pressure in the first and second wheel brakes during actuation of the brake pedal and individually supplies and controls the brake pressure in the first and second wheel brakes during non-actuation of the brake pedal, is required to perform anti-lock control, traction control and vehicle motion control.

Several other requirements are also placed on brake control systems. The brake pressure control apparatus is also required to be reduced in size, weight and cost. The brake pressure control apparatus is further required to rapidly increase the wheel brake pressure during non-actuation of the brake pedal, and to supply brake pressure from a master cylinder to the wheel brake when the brake pedal is depressed during the vehicle motion control.

SUMMARY OF THE INVENTION

Accordingly, a need exists for a brake pressure control apparatus which will satisfy above-mentioned requirements.

To address this need the present invention provides a brake pressure control apparatus for a vehicular hydraulic brake system including first and second wheel brakes for applying braking force to first and second wheels of a vehicle respectively, a master cylinder having a pressure generating chamber therein and operatively connected to a brake pedal of the vehicle, a first passage through which the first wheel brake is hydraulically connected the pressure generating chamber and a second passage through which the second wheel brake is hydraulically connected to the pressure generating chamber. The control apparatus includes a low back pressure reservoir, and a pump for pumping brake fluid in the low back pressure reservoir into the first and second wheel brakes. The pump has an inlet passage hydraulically connected to the low back pressure reservoir, and first and second outlet passages hydraulically connected to the first and second wheel brakes respectively. An electric motor drives the pump and a first brake pressure control valve is provided in the first passage. When the first brake pressure control valve hydraulically isolates the first wheel brake from the pressure generating chamber and hydraulically connects the first wheel brake to the low back pressure reservoir, the brake fluid in the first wheel brake flows into the low back pressure reservoir so that the first wheel brake is decreased in hydraulic pressure, and when the first brake pressure control valve hydraulically isolates the first wheel brake from the pressure generating chamber and the low back pressure reservoir, the pump pumps brake fluid in the low back pressure reservoir into the first wheel brake so that the first wheel brake is increased in hydraulic pressure. A second brake pressure control valve is provided in the second passage so that when the second brake pressure control valve hydraulically isolates the second wheel brake from the pressure generating chamber and hydraulically connects the second wheel brake to the low back pressure reservoir, the brake fluid in the second wheel brake flows into the low back pressure reservoir so that the second wheel brake is decreased in hydraulic pressure, and when the second brake pressure control valve hydraulically isolates the second wheel brake from the pressure generating chamber and the low back pressure reservoir, the pump pumps the brake fluid in the low back pressure reservoir into the second wheel brake so that the second wheel brake is increased in hydraulic pressure. A first check valve and a first orifice are provided in the first outlet passage of the pump through which the brake fluid in the low back pressure reservoir flows into the first wheel brake, and a second check valve and a second orifice are provided in the second outlet passage of the pump through which the brake fluid in the low back pressure reservoir flows into the second wheel brake. A third check valve has an inlet hydraulically connected to the first wheel brake and an outlet hydraulically connected to the pressure generating chamber, while a fourth check valve has an inlet hydraulically connected to the first wheel brake and an outlet hydraulically connected to the pressure generating chamber. A first valve device prevents communication between the outlets of the third and fourth check valves and the pressure generating chamber during non-actuation of the brake pedal, and a second valve device permits the pump to draw brake fluid from the pressure generating chamber when the pump is driven by the electric motor during non-actuation of the brake pedal. A fifth check valve is provided between the inlet passage and the low back pressure reservoir for blocking the brake fluid flow flowing from the inlet passage of the pump into the low back pressure reservoir when pressure generated in the pressure generating chamber is supplied to at least one of the first and second wheel brakes through the second valve device and the pump during the pump drawing the brake fluid from the pressure generating chamber.

Another aspect of the invention involves a brake pressure control apparatus for a vehicular hydraulic brake system that has first and second wheel brakes for applying a braking force to first and second wheels of a vehicle respectively, a master cylinder having a pressure generating chamber therein and operatively connected to a brake pedal of the vehicle, a first passage through which the first wheel brake is hydraulically connected the pressure generating chamber and a second passage through which the second wheel brake is hydraulically connected to the pressure generating chamber, wherein the control apparatus includes a low back pressure reservoir, and a pump for pumping brake fluid in the low back pressure reservoir into the first and second wheel brakes. The pump has an inlet passage hydraulically connected to the low back pressure reservoir, a first outlet passage hydraulically connected to the first wheel brake, and a second outlet passage hydraulically connected to the second wheel brake. An electric motor is connected to the pump for driving the pump, and a first brake pressure control valve is provided in the first passage for hydraulically isolating the first wheel brake from the pressure generating chamber and hydraulically connecting the first wheel brake to the low back pressure reservoir so that brake fluid in the first wheel brake flows into the low back pressure reservoir to decrease hydraulic pressure in the first wheel brake, and for hydraulically isolating the first wheel brake from both the pressure generating chamber and the low back pressure reservoir to permit the pump to pump brake fluid in the low back pressure reservoir into the first wheel brake to thereby increase hydraulic pressure in the first wheel brake. A second brake pressure control valve is provided in the second passage for hydraulically isolating the second wheel brake from the pressure generating chamber and hydraulically connecting the second wheel brake to the low back pressure reservoir so that brake fluid in the second wheel brake flows into the low back pressure reservoir to decrease hydraulic pressure in the second wheel brake, and for hydraulically isolating the second wheel brake from both the pressure generating chamber and the low back pressure reservoir to permit the pump to pump brake fluid in the low back pressure reservoir into the second wheel brake to thereby increase hydraulic pressure in the second wheel brake. A valve mechanism prevents communication between the pressure generating chamber and the first and second wheel brakes during non-actuation of the brake pedal, and permits the pump to draw brake fluid from the pressure generating chamber when the pump is driven by the electric motor during non-actuation of the brake pedal.

BRIEF DESCRIPTION OF THE DRAWING FIGURES

The foregoing and further features and advantages of the present invention will become more apparent from the following detailed description considered with reference to the accompanying drawing figures in which like elements are designated by like reference numerals and wherein.

DETAILED DESCRIPTION OF THE INVENTION

Figure 1:
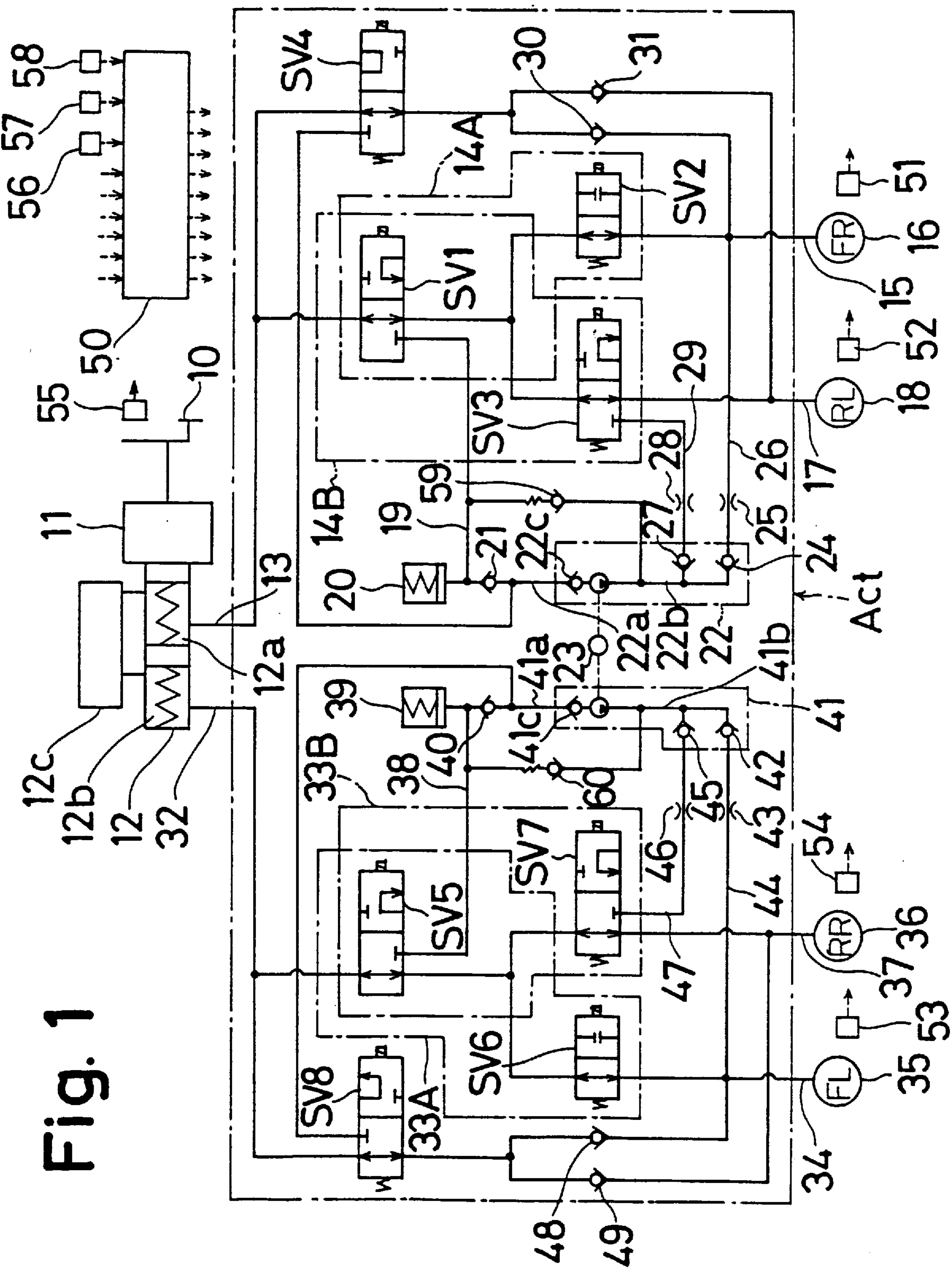
FIG. 1 is a schematic block diagram of a first embodiment of the brake pressure control apparatus according to the present invention.

Referring initially to FIG. 1, a vehicular hydraulic brake system according to a first embodiment of the brake pressure control apparatus is provided for a FF vehicle (front-engine front drive vehicle) in which a front left wheel brake for applying a braking force to the front left wheel which is a driving wheel and a rear right wheel brake for applying a braking force to the rear right wheel which is a non-driving wheel are hydraulically connected to a first pressure generating chamber of a tandem master cylinder. Additionally, a front right wheel brake for applying a braking force to a front right wheel which is a driving wheel and a rear wheel brake for applying a braking force to a rear wheel which is a non-driving wheel are hydraulically connected to a second pressure generating chamber of the master cylinder.

In the hydraulic brake system shown in FIG. 1, a brake operating force applied to a brake pedal 10 is increased by a negative pressure type booster 11, and is applied to a tandem master cylinder 12 which comprises a first pressure generating chamber 12*a* and a second pressure generating chamber 12*b*. A master cylinder reservoir 12*c* is coupled to the master cylinder 12 to supply brake fluid to the first and second pressure generating chambers 12*a* and 12*b*.

One of the pressure generating chambers 12*a* of the master cylinder 12 is hydraulically connected through a passage 13, a brake pressure control valve 14A of a brake pressure control apparatus and a passage 15 to the front right wheel brake 16, and through the passage 13, a brake pressure control valve 14B of the brake pressure control apparatus and a passage 17 to the rear left wheel brake 18.

The brake pressure control valve 14A comprises a three-port two-position type electromagnetic change-over valve SV1 and a two-port two-position type normally open electromagnet cut-off valve SV2. The brake pressure control valve 14B comprises the change-over valve SV1 and a three-port two-position type electromagnetic change-over valve SV3.

A first port of the change-over valve SV1 is hydraulically connected to the pressure generating chamber 12*a* through the passage 13, and a second port of the change-over valve SV1 is hydraulically connected to a first port of the cut-off valve SV2 and a first port of the change-over valve SV3. A third port of the change-over valve SV1 is hydraulically connected to a low back pressure reservoir 20 through a passage 19. A second port of the cut-off valve SV2 is hydraulically connected to the wheel brake 16 through the passage 15. A second port of the change-over valve SV3 is hydraulically connected to the wheel brake 18 through the passage 17, and a third port of the change-over valve SV3 is hydraulically connected to an outlet passage 22*b* of a pump 22 through an outlet branch passage 29 which is provided with a check valve 27 and an orifice 28 in series. The change-over valve SV1 is movable between a non-energized position in which the second port thereof is hydraulically isolated from the third port thereof and hydraulically connected to the first port thereof and an energized position in which the second port thereof is hydraulically isolated to the first port thereof and hydraulically connected to the third port thereof.

The change-over valve SV3 is movable between a non-energized position in which the second port thereof is hydraulically isolated from the third port thereof and hydraulically connected to the first port thereof and an energized position in which the second port thereof is hydraulically isolated to the first port thereof and hydraulically connected to the third port thereof.

The low back pressure reservoir 20 is a conventional one which includes a brake fluid chamber, defined in a cylinder by a piston which is urged by a spring so as to decrease the brake fluid chamber in volume. The reservoir 20 is hydraulically connected to the passage 19 and an inlet passage 22*a* of the pump 22 through a check valve 21. The check valve 21 blocks fluid flow flowing from the inlet passage 22*a* of the pump 22 into the low back pressure reservoir 20.

The pump 22 is a piston type pump, and is driven by an electric motor 23. The inlet passage 22*a* of the pump 22 is provided with a check valve 22*c* as an inlet valve. The outlet passage 22*b* of the pump 22 is hydraulically connected to the wheel brake 16 through a first outlet branch passage 26, which is provided with a check valve 24 and an orifice 25 in series, and the passage 15. The outlet passage 22_b_ of the pump is also connected to the second outlet branch passage 29 that is provided with a check valve 27 and an orifice 28. Each of the check valves 24 and 27 operates as an outlet valve of the pump 22.

A check valve 30 has an inlet hydraulically connected to the wheel brake 16 through the passage 15 and an outlet hydraulically connected to a second port of a three-port two-position type electromagnetic change-over valve SV4. A check valve 31 has an inlet hydraulically connected to the wheel brake 18 through the passage 17 and an outlet hydraulically connected to the second port of the change-over valve SV4.

The changeover valve SV4 has a first port hydraulically connected to the pressure generating chamber 12_a_ through the passage 13 and a third port hydraulically connected to the inlet passage 22_a_ of the pump 22.

The pressure generating chamber 12_b_ of the master cylinder 12 is hydraulically connected through a passage 32, a brake pressure control valve 33A of a brake pressure control apparatus and a passage 34 to a front left wheel brake 35, and is also connected through the passage 32, a brake pressure control valve 33B of the brake pressure control apparatus and a passage 37 to a rear right wheel brake 36.

The brake pressure control valve 33A comprises a three-port two-position type electromagnetic change-over valve SV5 and a two-port two-position type normally open electromagnetic cut-off valve SV6. The brake pressure control valve 33B comprises the change-over valve SV5 and a three-port two-position type electromagnetic change-over valve SV7.

A first port of the change-over valve SV5 is hydraulically connected to the pressure generating chamber 12_b_ through the passage 32, and a second port of the change-over valve SV5 is hydraulically connected to a first port of the cut-off valve SV6 and a first port of the changeover valve SV7. A third port of the change-over valve SV5 is hydraulically connected to a low back pressure reservoir 39 through a passage 38. A second port of the cut-off valve SV6 is hydraulically connected to the wheel brake 35 through the passage 34. A second port of the changeover valve SV7 is hydraulically connected to the wheel brake 36 through the passage 37, and a third port of the change-over valve SV7 is hydraulically connected to an outlet passage 41_b_ of a pump 41 through an outlet branch passage 47 which is provided with a check valve 45 and an orifice 46 in series.

The change-over valve SV5 is movable between a non-energized position in which the second port thereof is hydraulically isolated from the third port thereof and hydraulically connected to the first port thereof, and an energized position in which the second port thereof is hydraulically isolated from the first port thereof and hydraulically connected to the third port thereof.

The change-over valve SV7 is movable between a non-energized position in which the second port thereof is hydraulically isolated from the third port thereof and hydraulically connected to the first port thereof, and an energized position in which the second port thereof is hydraulically isolated from the first port thereof and hydraulically connected to the third port thereof.

The low back pressure reservoir 39 is a conventional one which includes a brake fluid chamber, defined in a cylinder by a piston which is urged by a spring so as to decrease the brake fluid chamber in volume. The reservoir 39 is hydraulically connected to the passage 38 and an inlet passage 41_a_ of the pump 41 through a check valve 40. The check valve 40 blocks fluid flow flowing from the inlet passage 41_a_ of the pump 41 into the low back pressure reservoir 38.

The pump 41 is a piston type pump and is driven by the electric motor 23. The inlet passage 41_a_ of the pump 41 is provided with a check valve 41_c_ as an inlet valve. The outlet passage 41_b_ of the pump 41 is hydraulically connected to the wheel brake 35 through a first outlet branch passage 44, which is provided with a check valve 42 and an orifice 43 in series, and the passage 34. The outlet passage 41_b_ of the pump 41 is also hydraulically connected to the outlet branch passage 47 which is provided with a check valve 45 and an orifice 46 in series. Each of the check valves 42 and 45 operates as an outlet valve of the pump 41.

A check valve 48 has an inlet hydraulically connected to the wheel brake 35 through the passage 34 and an outlet hydraulically connected to a second port of a three-port two-position type electromagnetic change-over valve SV8. A check valve 49 has an inlet hydraulically connected to the wheel brake 36 through the passage 37 and an outlet hydraulically connected to the second port of the change-over valve SV8.

The change-over valve SV8 has a first port hydraulically connected to the pressure generating chamber 12_b_ through the passage 32 and a third port hydraulically connected to the inlet passage 41_a_ of the pump 41.

Each of the electromagnetic valves SV1 and SV5 has no return spring, while each of the electromagnetic valves SV2, SV3, SV4, SV6, SV7 and SV5 has a return spring.

The electromagnetic valves SV1–SV5 and the electric motor 23 are electrically operated by an electronic control unit 50 which is supplied with output signals from rotation speed sensors 51, 52, 53 and 54 that are provided for the front right wheel, the rear left wheel, the front left wheel and the rear right wheel, an output signal of a stop switch 55 operatively connected to the brake pedal 10. The control unit 50 also receives an output signal from a steering angle sensor 56, an output signal from a yaw rate sensor 57, and an output signal from a lateral acceleration sensor 58. The electronic control unit 50 determines, based on the output signals of the sensors 51–58, whether or not an anti-lock control, a traction control or a vehicle motion control should be performed, and then performs the determined control.

A relief valve 59 has an inlet hydraulically connected to the outlet passage 22_b_ of the pump 22 and an outlet hydraulically connected to the passage 19. The relief valve 59 limits the maximum pressure in the outlet passage 22_b_ of the pump 22 to a predetermined value. A relief valve 60 has an inlet hydraulically connected to the outlet passage 41_b_ of the pump 41 and an outlet hydraulically connected to the passage 38. The relief valve 60 limits the maximum pressure in the outlet passage 41_b_ of the pump 41 to a predetermined value.

During the traveling of the vehicle while the brake pedal 10 is not depressed, the electromagnetic valves SV1–SV5 are positioned in their non-energized positions as shown in FIG. 1, and the motor 23 is not operated.

Upon depression of the brake pedal 10, brake fluid is supplied from the pressure generating chamber 12_a_ of the master cylinder 12 through the passage 13, the brake pressure control valve 14A and the passage 15 to the front right wheel brake 16, and through the passage 13, the change-over valve SV1, the brake pressure control valve 14B and the passage 17 to the rear left wheel brake 18. At the same time, brake fluid is supplied from the pressure generating chamber 12_b_ of the master cylinder 12 through the passage 32, the brake pressure control valve 33A and the passage 34 to the front left wheel brake 35, and through the passage 32, the brake pressure control valve 33B and the passage 37 to the rear right wheel brake 36. In this operation, the brake fluid in the passage 13 flows through the change-over valve SV1 and the cut-off valve SV2 to the passage 15, and at the same time it flows through the change-over valve SV1 and change-over valve SV3 to the passage 17.

Similarly, the brake fluid in the passage 32 flows through the changeover valve SV5 and the cut-off valve SV6 to the passage 34, and flows through the change-over valve SV5 and change-over valve SV7 to the passage 37. As a result, the brake pressure in the front right wheel brake 16, the rear left wheel brake 18, the front left wheel brake 35 and the rear right wheel brake 36 is increased so that the front right wheel brake 16, the rear left wheel brake 18, the front left wheel brake 35 and the rear right wheel brake 36 apply a braking force to the front right wheel, the rear left wheel, the front left wheel and the rear right wheel, respectively. When none of the four wheels tends to be locked, the brake pressures in the wheel brakes 16, 18, 35 and 36 correspond to the depressing force applied to the brake pedal 10.

When the brake pedal 10 is released, the fluid pressures in the pressure generating chambers 12*a* and 12*b* are decreased. Hence, the brake fluid in the front right wheel brake 16 is returned through the passage 15 and the passage 13 to the pressure generating chamber 12*a*, and the brake fluid in the rear left wheel brake 18 is returned through the passage 17 and the passage 13 to the pressure generating chamber 12*a*. Likewise, the brake fluid in the front left wheel brake 35 is returned through the passage 34 and the passage 32 to the pressure generating chamber 12*b*, and the brake fluid in the rear right wheel brake 36 is returned through the passage 37 and the passage 32 to the pressure generating chamber 12*b*. Thus, the brake pressure in each of the wheel brakes 16, 18, 35 and 36 is decreased, and the braking force applied to the front right wheel, the rear left wheel, the front left wheel and the rear right wheel is decreased. In this operation, the brake fluid in the passage 15 flows through the cut-off valve SV2 and changeover valve SV1 to the passage 13 on the one hand and through the check valve 30 and the change-over valve SV4 to the passage 13 on the other hand.

The brake fluid in the passage 17 flows through the change-over valve SV3 and change-over valve SV1 to the passage 13 on the one hand and through the check valve 31 and the change-over valve SV4 to the passage 13 on the other hand. The brake fluid in the passage 34 flows through the cut-off valve SV6 and change-over valve SV5 to the passage 32 on one hand and through the check valve 48 and the changeover valve SV8 to the passage 32 on the other hand. The brake fluid in the passage 37 flows through the change-over valve SV7 and change-over valve SV5 to the passage 32 on the one hand and through the check valve 49 and the change-over valve SV5 to the passage 32 on the other hand.

When, with the brake pedal depressed, any one of the front right wheel, the rear left wheel, the front left wheel and the rear right wheel tends to be locked, for instance when the front right wheel tends to be locked, the electronic control unit 50 determines that the front right wheel brake should be decreased in brake pressure. The control unit 50 then operates the electromagnetic changeover valve SV1 and the electromagnetic change-over valve SV3 into their energized positions and operates the electric motor 23 simultaneously. Because the changeover valve SV1 is operated in this manner, the front right wheel brake 16 is hydraulically connected through the passage 15, the cut-off valve SV2, the change-over valve SV1 and the passage 19 to the low back pressure reservoir 20, so that the brake fluid in the front right wheel brake 16 starts to flow to the low back pressure reservoir 20. Accordingly the brake pressure in the front right wheel brake 16 starts to decrease. In this operation, since the rear left wheel brake 18 has been hydraulically isolated from the change-over valve SV1 by the operation of the change-over valve SV3, the brake fluid in the rear left wheel brake 18 is prevented from flowing into the low back pressure reservoir 20.

The pump 22, being driven by the motor 23, draws the brake fluid, which flows into the low back pressure reservoir 20 from the front right wheel brake 16, through the check valve 21 and the inlet passage 22*a* and causes it to flow not only through the outlet passage 22*b* and the passage 26 to the passage 15 but also through the outlet passage 22*b* and the passage 29 to the passage 17. That is, since the passages 26 and 29 have the orifices 25 and 28, respectively, the fluid pressure in the passage 22*b* becomes higher than the brake pressure in the rear left wheel brake 18 which is higher than the brake pressure in the front right wheel brake 16, so that the brake fluid in the passage 22*b* is divided into two parts which flow into the passage 15 and the passage 17, respectively. The ratio of the flow rate of the brake fluid flowing into the passage 15 to the flow rate of the brake fluid flowing into the passage 17 depends on the ratio of the area of the orifice 25 to the area of the orifice 29. The check valve 27 eliminates the difficulty that, when the pump 22 is in the suction stroke, the brake fluid in the rear left wheel brake 18 which is higher in fluid pressure, flows through the passage 17, the changeover valve SV3, the passage 28, the passage 22*b*, the passage 26 and the passage 15 to the front right wheel brake 16 which is lower in fluid pressure.

As the pump 22 is operated, brake fluid flows from the low back pressure 20 to the passage 15, and accordingly to the front right wheel brake 16 in the above-described manner. In this case, the flow rate of the brake fluid is much smaller than the flow rate of the brake fluid which flows from the front right wheel brake 16 through the passage 15, the cut-off valve SV2, the change-over valve SV1 and the passage 19 to the low back pressure reservoir 20, and therefore the brake pressure in the front right wheel brake 16 is decreased continuously. Since the flow of brake fluid from the rear left wheel brake 18 to the low back pressure reservoir 20 has been stopped by the operation of the change-over valve SV3 and the flow of the brake fluid from the pump 22 to the rear left wheel brake 18 has been established by the operation of the change-over valve SV3, the rear left wheel brake 18 is increased in brake pressure as the brake fluid is caused to flow into the rear left wheel brake 18 by the operation of the pump 22.

When the locking tendency the front right wheel is eliminated, the electronic control unit 50 determines that the front right wheel brake 16 should be increased in brake pressure, and operates the cut-off valve SV2 into the energized position in which the flow of brake fluid from the front right wheel brake 16 to the low back pressure reservoir 20 is stopped. As a result, the brake pressure in the front right wheel brake 16 is increased as the brake fluid flows into it by the operation of the pump 22.

The pump 41 is also driven by the operation of the electric motor 23, but since the low back pressure reservoir 39 is empty, the pump 41 merely spins.

When the front left wheel tends to be locked while the brake pressure in the front right wheel brake 16 is being controlled, the electronic control unit 50 determines that the front left wheel brake 35 should be decreased in brake pressure, and operates the electromagnetic change-over valve SV5 and the electromagnetic change-over valve SV7 into their energized positions. As the change-over valve SV5 is operated in this manner, the front left wheel brake 35 is hydraulically connected through the passage 34, the cut-off valve SV6, the change-over valve SV5 and the passage 38 to the low back pressure reservoir 39, so that the brake fluid in the front left wheel brake 35 starts to flow to the low back pressure reservoir 39. Accordingly, the brake pressure in the front left wheel brake 35 starts to decrease. In this operation, since the rear right wheel brake 36 has been hydraulically isolated from the change-over valve SV5 by the operation of the change-over valve SV7, the brake fluid in the rear right wheel brake 36 is prevented from flowing into the low back pressure reservoir 39.

The pump 41, being driven by the motor 23, draws the brake fluid, which flows into the low back pressure reservoir 39 from the front left wheel brake 35, through the check valve 40 and the inlet passage 41*a* and causes it to flow not only through the outlet passage 41*b* and the passage 44 to the passage 34 but also through the outlet passage 41*b* and the passage 47 to the passage 37. That is, since the passages 34 and 37 are provided with the orifices 43 and 46 respectively, the fluid pressure in the passage 41*b* becomes higher than the brake pressure in the rear right wheel brake 36 which is higher than the brake pressure in the front left wheel brake 35, and so the brake fluid in the passage 41*b* is divided into two parts which flow into the passage 34 and the passage 37, respectively. The ratio of the flow rate of the brake fluid flowing into the passage 34 to the flow rate of the brake fluid flowing into the passage 37 depends on the ratio of the area of the orifice 43 to the area of the orifice 46. The check valve 45 eliminates the difficulty that, when the pump 41 is in the suction stroke, the brake fluid in the rear right wheel brake 36 which is higher in fluid pressure, flows through the passage 37, the change-over valve SV7, the passage 47, the passage 41*b*, the passage 44 and the passage 34 to the front left wheel brake 35 which is lower in fluid pressure.

As the pump 41 is operated, the brake fluid flows from the low back pressure 39 to the passage 34, and accordingly to the front left wheel brake 35 in the above-described manner. In this case, the flow rate of the brake fluid is much smaller than the flow rate of the brake fluid which flows from the front left wheel brake 35 through the passage 34, the cut-off valve SV6, the change-over valve SV5 and the passage 38 to the low back pressure reservoir 39, and therefore the brake pressure in the front left wheel brake 35 is decreased continuously. Since the flow of brake fluid from the rear right wheel brake 36 to the low back pressure reservoir 39 has been stopped by the operation of the change-over valve SV7 and the flow of brake fluid from the pump 41 to the rear right wheel brake 36 has been established by the operation of the change-over valve SV7, the rear right wheel brake 36 is increased in brake pressure as the brake fluid is caused to flow into the rear right wheel brake 36 by the operation of the pump 41.

When the locking tendency of the front left wheel is eliminated, the electronic control unit 50 determines that the front left wheel brake 35 should be increased in brake pressure, and operates the cut-off valve SV6 into the energized position in which the flow of brake fluid from the front left wheel brake 35 to the low back pressure reservoir 39 is stopped. As a result, the brake pressure in the front left wheel brake 35 is increased as the brake fluid flows into it by the operation of the pump 41.

When for instance the rear left wheel and rear right wheel tend to be locked while the brake pressure in the front right wheel brake and the brake pressure in the front left wheel brake are being controlled, the electronic control unit 50 determines that the rear left wheel brake 18 and the rear right wheel brake 36 should be decreased in brake pressure, and operates the change-over valves SV3 and SV7 into their non-energized position. As the change-over valve SV3 is operated into the non-energized position in this manner, the brake fluid in the rear left wheel brake 18 flows through the passage 17, the change-over valve SV3, the change-over valve SV1 and the passage 19 to the low back pressure reservoir 20. On the other hand, brake fluid is supplied to the rear left wheel brake 18 by the operation of the pump 22, however the flow rate of the brake fluid into the rear left wheel brake 18 is much smaller than the flow rate of brake fluid which flows from the rear left wheel brake 18 to the low back pressure reservoir 20. Therefore, the brake pressure in the rear left wheel brake 18 starts to decrease.

Similarly as in the above-described case, as the change-over valve SV7 is operated into the non-energized position in this manner, the brake fluid in the rear right wheel brake 36 flows through the passage 37, the change-over valve SV7, the change-over valve SV5 and the passage 38 to the low back pressure reservoir 39. On the other hand, brake fluid is supplied to the rear right wheel brake 36 by the operation of the pump 41, although the flow rate of the brake fluid into the rear right wheel brake 36 is much smaller than the flow rate of brake fluid which flows from the rear right wheel brake 36 to the low back pressure reservoir 39. Therefore, the brake pressure in the rear right wheel brake 36 starts to decrease.

When the locking tendency of the rear left wheel is eliminated by the reduction of the brake pressure in the rear left wheel brake 18, the electronic control unit 50 determines that the brake pressure in the rear left wheel brake 18 should be increased, and operates the electromagnetic change-over valve SV3 into the energized position again to stop the flow of brake fluid from the rear left wheel brake 18 to the low back pressure reservoir 20. As a result, the rear left wheel brake 18 is increased in brake pressure as the brake fluid flows into it by the operation of the pump 22. Similarly as in the above-described case, when the locking tendency of the rear right wheel is eliminated by the reduction of the brake pressure in the rear right wheel brake 36, the electronic control unit 50 determines that the brake pressure in the rear right wheel brake 36 should be increased, and operates the electromagnetic change-over valve SV7 into the energized position again to stop the flow of brake fluid from the rear right wheel brake 36 to the low back pressure reservoir 20. As a result, the rear right wheel brake 36 is increased in brake pressure as the brake fluid flows into it by the operation of the pump 41.

As was described above, the brake pressure in the front right wheel brake 16 and the brake pressure in the rear left wheel brake 18 can be individually decreased or increased by individually activating or releasing the valves SV2 and SV3 with the valve SV1 and the motor 23 operated. Similarly, the brake pressure in the front left wheel brake 35 and the brake pressure in the rear right wheel brake 36 can be individually decreased or increased by individually activating or releasing the valves SV6 and SV7 with the valve SV5 and the motor 23 operated. And, when, while the front right wheel brake 16 and the rear left wheel brake 18 are being increased in brake pressure with the valves SV2 and SV3 energized, the valve SV1 is released and the valve SV2 and/or the valve SV3 is released, brake fluid flows from the pressure generating chamber 12a into the front right wheel brake 16 and/or the rear left wheel brake 18 to quickly increase the brake pressure in the front right wheel brake 16 and/or the brake pressure in the rear left wheel brake 18. Similarly, when, while the front left wheel brake 35 and the rear right wheel brake 36 are being increased in brake pressure with the valves SV6 and SV7 energized, the valve SV5 is released and the valve SV6 and/or the valve SV7 is released, brake fluid flows from the pressure generating chamber 12b into the front left wheel brake 35 and/or the rear right wheel brake 36 to quickly increase the brake pressure in the front left wheel brake 35 and/or the brake pressure in the rear right wheel brake 36.

When, while the wheel brakes 16, 18, 35 and 36 are being subjected to brake pressure control, the depressing force applied to the brake pedal 10 is greatly decreased, the pressure generating chambers 12a and 12b are greatly decreased in fluid pressure. In this case, the brake fluid in the front right wheel brake 16 and the brake fluid in the rear left wheel brake 18 return respectively through the check valves 30 and 31 and through the change-over valve SV4 to the pressure generating chamber 12a, while similarly the brake fluid in the front left wheel brake 35 and the brake fluid in the rear right wheel brake 36 return respectively through the check valves 48 and 49 and through the changeover valve SV8 to the pressure generating chamber 12b. Thus, the brake pressure in the wheel brakes 16 and 18 is decreased to the fluid pressure in the pressure generating chamber 12a, while the brake pressure in the wheel brakes 35 and 36 is decreased to the fluid pressure in the pressure generating chamber 12b.

Consider the situation where, when the vehicle starts to move or increases speed, for instance the front right wheel and the front left wheel tend to spin. In this case, electronic control unit 50 determines that the front right wheel brake 16 and the front left wheel brake 35 should be increased in brake pressure, and operates the cut-off valve SV2 and the change-over valve SV4, and operates the cut-off valve SV6 and the change-over valve SV8, and operates the motor 23. When the valve SV2 is operated in the above-described manner, the flow of brake fluid from the front right wheel brake 16 is inhibited, and since the valve SV4 is operated in the above-described manner, the inlet passage 22a of the pump 22 is hydraulically connected through the valve SV4 and the passage 13 to the pressure generating chamber 12a which is communicated with the master cylinder reservoir 12c during non-actuation of the brake pedal 10.

Similarly, when valve SV4 is operated in the above-described manner, the flow of brake fluid from the front left wheel brake 35 is inhibited, and since the valve SV8 is operated in the above-described manner, the inlet passage 41a of the pump 41 is hydraulically connected through the valve SV8 and the passage 32 to the pressure generating chamber 12b which is in communication with the master cylinder reservoir 12c during non-actuation of the brake pedal 10. When the motor 23 is operated in the above-described manner, the pumps 22 and 41 are driven. As a result, the pump 22 draws brake fluid from the master cylinder reservoir 12c through the pressure generating chamber 12a and supplies it to the front right wheel brake 16 only, while the pump 41 draws brake fluid from the master cylinder reservoir 12c through the pressure generating chamber 12b and supplies it to the front left wheel brake 35 only. Hence, the front right wheel brake 16 and the front left wheel brake 35 are rapidly increased in brake pressure so that braking forces are applied to the front right wheel and the front left wheel.

The front right wheel brake 16 is not increased in brake pressure until the valves SV2 and SV4 are operated. Similarly, the front left wheel brake 35 is not increased in brake pressure until the valves SV6 and SV8 are operated.

When the tendency of the front right wheel to spin is eliminated, the electronic control unit 50 releases the cut-off valve SV2, so that the brake fluid in the front right wheel brake 16 flows through the valves SV2 and SV1 to the passage 13 and the front right wheel brake 16 is decreased in brake pressure. Similarly, when the tendency of the front left wheel to spin is eliminated, the electronic control unit 50 releases the cut-off valve SV6, so that the brake fluid in the front left wheel brake 35 flows through the valves SV6 and SV5 to the passage 32 and the front left wheel brake 35 is decreased in brake pressure.

While the spin of the front right wheel and/or the spin of the front left wheel is being suppressed, the front right wheel brake 16 and/or the front left wheel brake 35 can be adjusted in brake pressure by controlling the operation of the valve SV2 and/or the valve SV4.

When, while the front right wheel brake 16 and the front left wheel brake 35 are being subjected to brake pressure control, the brake pedal 10 is depressed, the brake fluid is supplied from the pressure generating chamber 12a of the master cylinder 12 through the passage 13, the change-over valve SV4, the pump 22 and the passage 15 to the front right wheel brake 16, and through the passage 13, the change-over valve SV1, the change-over valve SV3 and the passage 17 to the rear left wheel brake 18. At the same time, the brake fluid is supplied from the pressure generating chamber 12b of the master cylinder 12 through the passage 32, the change-over valve SV8, the pump 41 and the passage 34 to the front left wheel brake 35, and through the passage 32, the change-over valve SV5, the change-over valve SV7 and the passage 37 to the rear right wheel brake 36. In this operation, the check valve 21 prevents the brake fluid in the inlet passage 22a from flowing into the low back pressure reservoir 20, and the check valve 40 prevents the brake fluid in the inlet passage 41a from flowing into the low back pressure reservoir 39. As a result, the brake pressures in the wheel brakes 16, 18, 35 and 36 are increased to the fluid pressure in the pressures generating chambers 12a and 12b.

Consider next the situation where, when the vehicle turns to the left side, for instance the vehicle tends to excessively over-steer. In this case, the electronic control unit 50 determines that the front right wheel brake 16 should be increased in brake pressure to apply the braking force to the front right wheel, and operates the cut-off valve SV2 and the change-over valve SV4, and operates the motor 23. When the valve SV2 is operated in the above-described manner, the flow of brake fluid from the front right wheel brake 16 is inhibited, and since the valve SV4 is operated in the above-described manner, the inlet passage 22a of the pump 22 is hydraulically connected through the valve SV4 and the passage 13 to the pressure generating chamber 12a which is communicated with the master cylinder reservoir 12c during non-actuation of the brake pedal 10. When the motor 23 is operated in the above-described manner, the pumps 22 and 41 are driven. As a result, the pump 22 draws brake fluid from the master cylinder reservoir 12c through the pressure generating chamber 12a and supplies it to the front right wheel brake 16 only. Hence, the front right wheel brake 16 is rapidly increased in brake pressure so that braking force is applied to the front right wheel. When the tendency of the vehicle to over-steer is eliminated, the electronic control unit 50 releases the cut-off valve SV2 so that brake fluid in the front right wheel brake 16 flows through the valves SV2 and SV1 to the passage 13 and the front right wheel brake 16 is decreased in brake pressure. While the over-steering of the vehicle is being suppressed, the front right wheel brake 16 can be adjusted in brake pressure by controlling the operation of the valve SV2.

When the vehicle turns to the right side to such an extent that the vehicle tends to experience excessive over-steer, the electronic control unit 50 determines that the front left wheel brake 35 should be increased in brake pressure to apply a braking force to the front left wheel. The control unit 50 thus operates the cut-off, valve SV6 and the change-over valve SV8, and also operates the motor 23. When the valve SV6 is operated in the above-described manner, the flow of brake fluid from the front left wheel brake 35 is inhibited. Also, since the valve SV5 is operated in the above-described manner, the inlet passage 41*a* of the pump 41 is hydraulically connected through the valve SV8 and the passage 32 to the pressure generating chamber 12*b* which is communicated with the master cylinder reservoir 12*c* during non-actuation of the brake pedal 10. When the motor 23 is operated in the above-described manner, the pumps 22 and 41 are driven. As a result, the pump 41 draws brake fluid from the master cylinder reservoir 12*c* through the pressure generating chamber 12*b* and supplies it to the front left wheel brake 35 only. Hence, the front left wheel brake 35 is rapidly increased in brake pressure so that a braking force is applied to the front right wheel. When the tendency of the vehicle to over-steer is eliminated, the electronic control unit 50 releases the cut-off valve SV4 so that the brake fluid in the front left wheel brake 35 flows through the valves SV6 and SV5 to the passage 32 and the front left wheel brake 35 is decreased in brake pressure. While the over-steering of the vehicle is being suppressed, the front left wheel brake 35 can be adjusted in brake pressure by controlling the operation of the valve SV6.

When, while the vehicle is turning to the left side, the vehicle tends to experience excessive under-steer, the electronic control unit 50 determines that the rear left wheel brake 18, the front right wheel brake 16 and the rear right wheel brake 36 should be increased in brake pressure to apply braking forces to the rear left wheel, the front right wheel and the rear right wheel. The control unit 50 operates the valves SV2, SV3, SV4, SV7 and SV8, and operates the motor 23. As a result, the pump 22 draws brake fluid from the master cylinder reservoir 12*c* through the pressure generating chamber 12*a* and supplies it to the rear left wheel brake 18 and the front right wheel brake 16, and the pump 41 draws brake fluid from the master cylinder reservoir 12*c* through the pressure generating chamber 12*b* and supplies it to the rear right wheel brake 36. Hence, the wheel brakes 16, 18 and 36 are increased in brake pressure so that braking forces are applied to the front right wheel, the rear left wheel and the rear right wheel. When the tendency of the vehicle to under-steer is eliminated, the electronic control unit 50 releases the valves SV2, SV3 and SV7. Thus, the brake fluid in the wheel brake 16 flows through the valves SV2 and SV1 to the passage 13, the brake fluid in the wheel brake 18 flows through the valves SV3 and SV1 to the passage 13, and the brake fluid in the wheel brake 36 flows through the valves SV7 and SV5 to the passage 32, so that the wheel brakes 16, 18 and 36 are decreased in brake pressure. While the under-steer of the vehicle is being suppressed, the wheel brakes 16, 18 and 36 can be adjusted in brake pressure by controlling the operation of the valves SV2, SV3 and SV7 respectively.

When, while the vehicle is turning to the right side, the vehicle tends to experience excessive under-steer, the electronic control unit 50 determines that the rear right wheel brake 36, the front left wheel brake 35 and the rear left wheel brake 18 should be increased in brake pressure to apply the braking forces to the rear right wheel, the front left wheel and the rear left wheel. The control unit 50 operates the valves SV3, SV4, SV6, SV7 and SV8, and operates the motor 23. As a result, the pump 22 draws brake fluid from the master cylinder reservoir 12*c* through the pressure generating chamber 12*a* and supplies it to the rear left wheel brake 18, and the pump 41 draws brake fluid from the master cylinder reservoir 12*c* through the pressure generating chamber 12*b* and supplies it to the front left wheel brake 35 and the rear right wheel brake 36. Hence, the wheel brakes 18, 35 and 36 are increased in brake pressure so that the braking forces are applied to the rear left wheel, the front left wheel and the rear right wheel. When the tendency of the vehicle to under-steer is eliminated, the electronic control unit 50 releases the valves SV3, SV6 and SV7 so that the brake fluid in the wheel brake 18 flows through the valves SV3 and SV1 to the passage 13, the brake fluid in the wheel brake 35 flows through the valves SV6 and SV5 to the passage 32, and the brake fluid in the wheel brake 36 flows through the valves SV7 and SV5 to the passage 32. Consequently, the wheel brakes 18, 35 and 36 are decreased in brake pressure. While the under-steer of the vehicle is being suppressed, the wheel brakes 18, 35 and 36 can be adjusted in brake pressure by controlling the operation of the valves SV3, SV6 and SV7 respectively.

When the brake pedal 10 is depressed while the wheel brake 16 or the wheel brake 35 is being subjected to brake pressure control to eliminate the excessive oversteer or while the wheel brakes 16, 18 and 36 or the wheel brakes 18, 35 and 36 are being subjected to brake pressure control to eliminate excessive under-steer, the wheel brake not being subjected to brake pressure control is supplied with brake fluid through the brake pressure control valve 14A or 14B or 33A or 33B from the master cylinder 12 and the wheel brake under brake pressure control is supplied with brake fluid through the pump 22 or 41 from the master cylinder 12.

Figure 2:
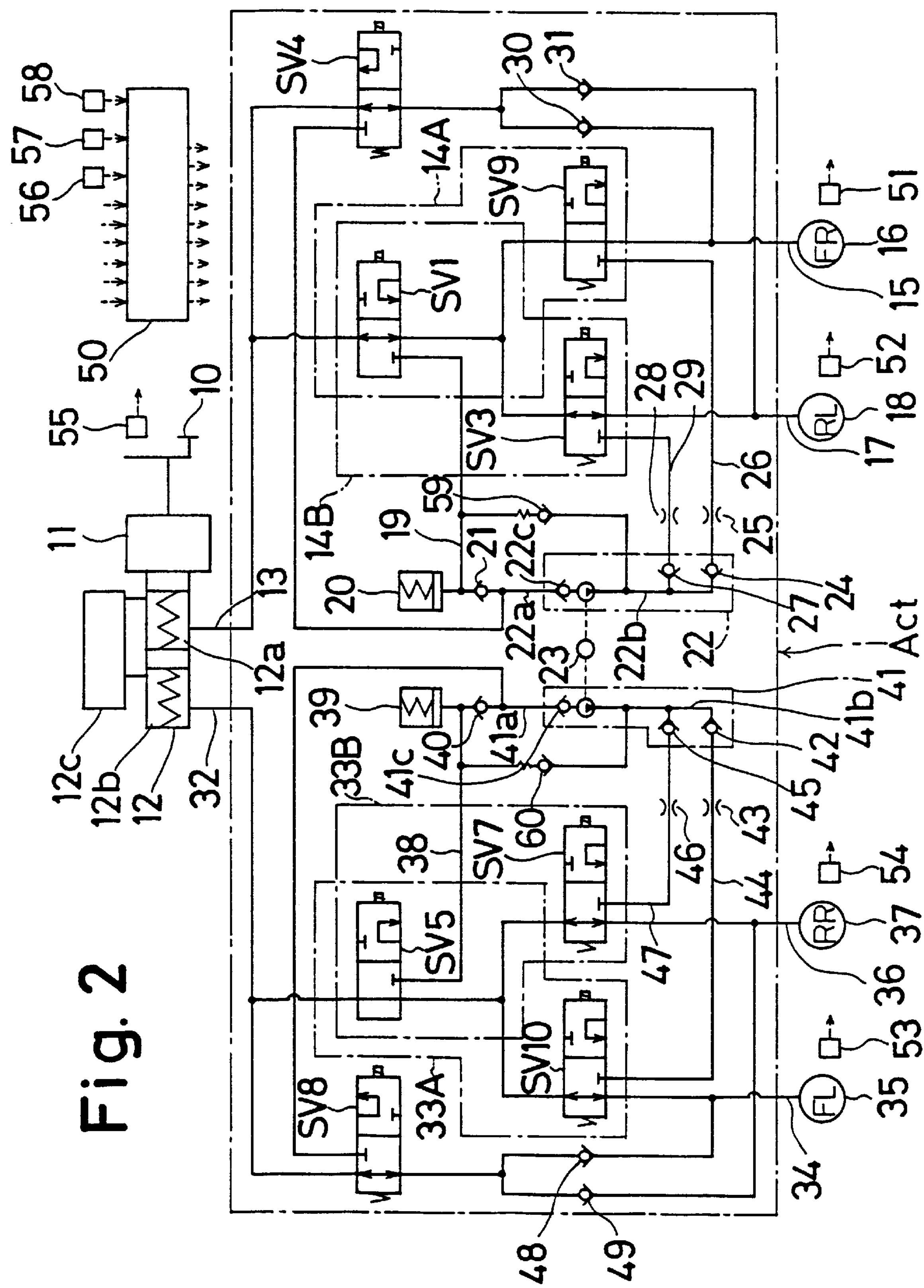
FIG. 2 is a schematic block diagram of a second embodiment of the brake pressure control apparatus according to the present invention.

Referring to FIG. 2, there is shown a vehicular hydraulic brake system including a second embodiment of the brake pressure control apparatus according to the present invention. The vehicular hydraulic brake system is provided for an FF vehicle (front-engine front drive vehicle) in which a front left wheel brake for applying a braking force to the front left wheel which is a driving wheel and a rear right wheel brake for applying a braking force to the rear right wheel which is a non-driving wheel are hydraulically connected to a first pressure generating chamber of a tandem master cylinder, and a front right wheel brake for applying a braking force to a front right wheel which is driving wheel and a rear wheel brake for applying a braking force to a rear wheel which is a non-driving wheel are hydraulically connected to a second pressure generating chamber of the master cylinder.

In the system shown in FIG. 2, the features which correspond functionally to those which have been described with reference to the FIG. 1 system are designated by the same reference numerals or characters and a detailed description of such features is not repeated here. The second embodiment involves replacing the electromagnetic cut-off valves SV2 and SV6 in the first embodiment respectively with three-port two-position type electromagnetic change-over valves SV9 and SV10. The electromagnetic change-over valve SV9 has a first port hydraulically connected to the second port of the electromagnetic change-over valve SV1, a second port hydraulically connected to the wheel brake 16 and a third port hydraulically connected to the passage 26 of the pump 22. The change-over valve SV9 is movable between a non-energized position in which the second port thereof is hydraulically isolated from the third port thereof and hydraulically connected to the first port thereof, and an energized position in which the second port thereof is hydraulically isolated from the first port thereof and hydraulically connected to the third port thereof.

The electromagnetic change-over valve SV10 has a first port hydraulically connected the second port of the electromagnetic change-over valve SV5, a second port hydraulically connected to the wheel brake 35 and a third port hydraulically connected to the passage 44 of the pump 41. The change-over valve SV10 is movable between a non-energized position in which the second port thereof is hydraulically isolated from the third port thereof and hydraulically connected to the first port thereof, and an energized position in which the second port thereof is hydraulically isolated from the first port thereof and hydraulically connected to the third port thereof.

In the situation where the vehicle tends to experience excessive over-steer and it is necessary to increase the brake pressure in the front right wheel brake 16 or the front left wheel brake 35, the electromagnetic change-over valves SV9 or SV10 are operated, and the brake fluid discharged from the pump 22 is all supplied to the front right wheel brake 16, while the brake fluid discharged from the pump 41 is all supplied to the front left wheel brake 35. Hence, the rate of increasing the brake pressure in the wheel brake 16 or the wheel brake 35 can be made higher than in the case of the first embodiment.

Further detailed description of the operation of the second embodiment is omitted because it is substantially the same as and can be readily understood from the above description of the first embodiment.

Figure 3:
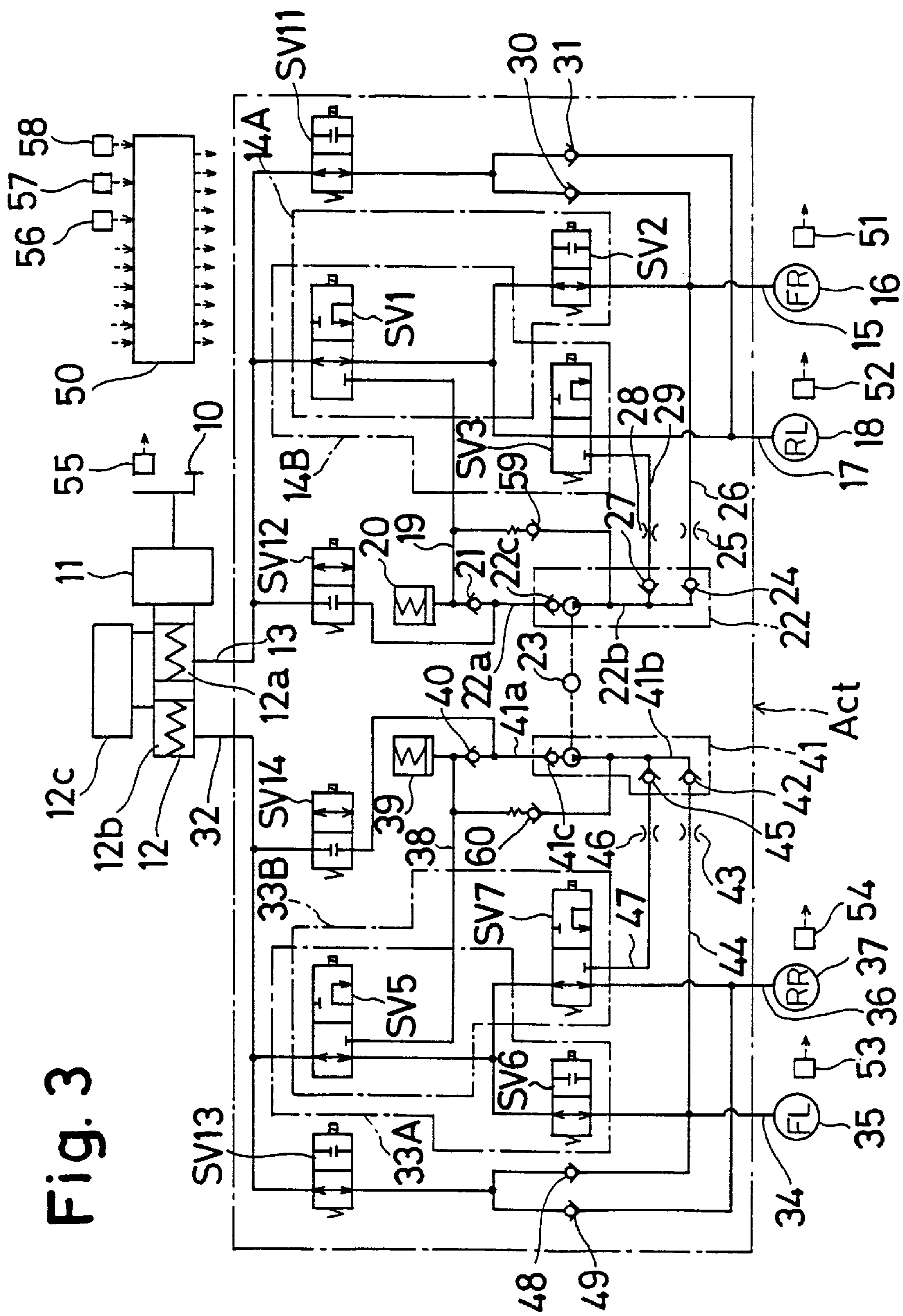
FIG. 3 is a schematic block diagram of a third embodiment of the brake pressure control apparatus according to the present invention.

Referring to FIG. 3, there is shown a vehicular hydraulic brake system including a third embodiment of the brake pressure control apparatus according to the present invention. The vehicular hydraulic brake system is also provided for an FF vehicle (front-engine front drive vehicle) in which a front left wheel brake for applying a braking force to the front left wheel which is a driving wheel and a rear right wheel brake for applying a braking force to the rear right wheel which is a non-driving wheel are hydraulically connected to a first pressure generating chamber of a tandem master cylinder, and a front right wheel brake for applying a braking force to a front right wheel which is driving wheel and a rear wheel brake for applying a braking force to a rear wheel which is a non-driving wheel are hydraulically connected to a second pressure generating chamber of the master cylinder.

In the system shown in FIG. 3, features corresponding functionally to those which have been described above with reference to the system shown in FIG. 1 are designated by the same reference numerals or characters and a detailed description of such features is not repeated again. The third embodiment involves replacing the electromagnetic change-over valve SV4 with a normally open electromagnetic cut-off valve SV11 and a normally closed electromagnetic cut-off valve SV12, and replacing the electromagnetic changeover valve SV8 with a normally open electromagnetic cut-off valve SV13 and a normally closed electromagnetic cut-off valve SV14.

The normally open electromagnetic cut-off valve SV11 has a first port hydraulically connected to the pressure generating chamber 12*a* and a second port hydraulically connected to the outlets of the check valves 30 and 31, and the normally closed electromagnetic cut-off valve SV12 has a first port hydraulically connected to the pressure generating chamber 12*a* and a second port hydraulically connected to the inlet passage 22*a* of the pump 22.

The normally open electromagnetic cut-off valve SV13 has a first port hydraulically connected to the pressure generating chamber 12*b* and a second port hydraulically connected to the outlets of the check valves 48 and 49, and the normally closed electromagnetic cut-off valve SV13 has a first port hydraulically connected to the pressure generating chamber 12*b* and a second port hydraulically connected to the inlet passage 41*a* of the pump 41.

A detailed description of the operation of the third embodiment is substantially the same as the first embodiment and can be readily understood from the above description, except that the valves SV11, SV12 and the valves SV13, SV14 are controlled in a manner designed to achieve the same results as the operation of the valve SV4 and the valve SV8 respectively.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A brake pressure control apparatus for a vehicular hydraulic brake system including first and second wheel brakes for applying braking force to first and second wheels of a vehicle respectively, a master cylinder having a pressure generating chamber therein and operatively connected to a brake pedal of the vehicle, a first passage through which the first wheel brake is hydraulically connected to the pressure generating chamber and a second passage through which the second wheel brake is hydraulically connected to the pressure generating chamber comprising:

a low back pressure reservoir;

a pump for pumping brake fluid in the low back pressure reservoir into the first and second wheel brakes, the pump having an inlet passage hydraulically connected to the low back pressure reservoir and first and second outlet passages hydraulically connected to the first and second wheel brakes respectively;

an electric motor connected to the pump for driving the pump;

first brake pressure control valve means provided in the first passage for hydraulically isolating the first wheel brake from the pressure generating chamber and hydraulically connecting the first wheel brake to the low back pressure reservoir so that brake fluid in the first wheel brake flows into the low back pressure reservoir to decrease hydraulic pressure in the first wheel brake, and for hydraulically isolating the first wheel brake from both the pressure generating chamber and the low back pressure reservoir so that the pump pumps brake fluid in the low back pressure reservoir into the first wheel brake to increase hydraulic pressure in the first wheel brake;

second brake pressure control valve means provided in the second passage for hydraulically isolating the second wheel brake from the pressure generating chamber and hydraulically connecting the second wheel brake to the low back pressure reservoir so that brake fluid in the second wheel brake flows into the low back pressure reservoir to decrease hydraulic pressure in the second wheel brake, and for isolating the second wheel brake from both the pressure generating chamber and the low back pressure reservoir so that the pump pumps brake fluid in the low back pressure reservoir into the second wheel brake to increase hydraulic pressure in the second wheel brake;

a first check valve and a first orifice provided in the first outlet passage of the pump through which brake fluid pumped from the low back pressure reservoir flows into the first wheel brake;

a second check valve and a second orifice provided in the second outlet passage of the pump through which brake fluid pumped from the low back pressure reservoir flows into the second wheel brake;

a third check valve having an inlet hydraulically connected to the first wheel brake and an outlet hydraulically connected to the pressure generating chamber;

a fourth check valve having an inlet hydraulically connected to the second wheel brake and an outlet hydraulically connected to the pressure generating chamber;

a first valve means for preventing the outlets of the third and fourth check valves from communicating with the pressure generating chamber during non-actuation of the brake pedal;

a second valve means for permitting the pump to draw brake fluid from the pressure generating chamber when the pump is driven by the electric motor during non-actuation of the brake pedal; and a fifth check valve provided between the inlet passage of the pump and the low back pressure reservoir for preventing brake fluid flow from the inlet passage of the pump into the low back pressure reservoir when pressure generated in the pressure generating chamber is supplied to at least one of the first and second wheel brakes through the second valve means and the pump when the pump is drawing the brake fluid from the pressure generating chamber.

2. A brake pressure control apparatus according to claim 1, wherein;

the first wheel is a driving front wheel of the vehicle;

the second wheel is a non-driving rear wheel of the vehicle;

the first brake pressure control valve means comprises a first electromagnetic change-over valve having a first port hydraulically connected to the pressure generating chamber, a second port, and a third port hydraulically connected to the low back pressure reservoir, the first electromagnetic change-over valve being movable between a non-energized position in which the second port is hydraulically isolated from the third port and hydraulically connected to the first port and an energized position in which the second port is hydraulically isolated from the first port and hydraulically connected to the third port, and a first normally open electromagnetic cut-off valve having a first port hydraulically connected to the second port of the first electromagnetic change-over valve and a second port hydraulically connected to the first wheel brake;

the second brake pressure control valve means comprising the first electromagnetic change-over valve and a second electromagnetic change-over valve having a first port hydraulically connected to the second port of the first electromagnetic change-over valve, a second port hydraulically connected to the second wheel brake and a third port hydraulically connected to the second outlet passage of the pump, the second electromagnetic change-over valve being movable between a non-energized position in which the second port thereof is hydraulically isolated from the third port thereof and hydraulically connected to the first port thereof and an energized position in which the second port thereof is hydraulically isolated from the first port thereof and hydraulically connected to the third port thereof; and the first outlet passage of the pump is directly connected to the first wheel brake.

3. A brake pressure control apparatus according to claim 1, wherein;

the first wheel is a driving front wheel of the vehicle;

the second wheel is a non-driving rear wheel of the vehicle;

the first brake pressure control valve means comprises a first electromagnetic change-over valve having a first port hydraulically connected to the pressure generating chamber, a second port, and a third port hydraulically connected to the low back pressure reservoir, the first electromagnetic change-over valve being movable between a non-energized position in which the second port is hydraulically isolated from the third port and hydraulically connected to the first port and an energized position in which the second port is hydraulically isolated from the first port and hydraulically connected to the third port, and a second electromagnetic change-over valve having a first port hydraulically connected to the second port of the first electromagnetic change-over valve, a second port hydraulically connected to the first wheel brake and a third port hydraulically connected to the first outlet passage of the pump, the second electromagnetic change-over valve being movable between a non-energized position in which the second port thereof is hydraulically isolated from the third port thereof and hydraulically connected to the first port thereof and an energized position in which the second port thereof is hydraulically isolated from the first port thereof and hydraulically connected to the third port thereof;

the second brake pressure control valve means comprises the first electromagnetic change-over valve and a third electromagnetic change-over valve having a first port hydraulically connected the second port of the first electromagnetic change-over valve, a second port hydraulically connected to the second wheel brake and a third port hydraulically connected to the second outlet passage of the pump, the third electromagnetic change-over valve being movable between a non-energized position in which the second port thereof is hydraulically isolated from the third port thereof and hydraulically connected to the first port thereof and an energized position in which the second port thereof is hydraulically isolated from the first port thereof and hydraulically connected to the third port thereof.

4. A brake pressure control apparatus according to claim 1, wherein the first and second valve means are defined by an electromagnetic change-over valve having a first port hydraulically connected to the pressure generating chamber, a second port hydraulically connected to the outlets of the third and fourth check valve and a third port hydraulically connected to the inlet passage of the pump, the electromagnetic change-over valve being movable between a non-energized position in which the first port is hydraulically isolated from the third port and hydraulically connected to the second port and a energized position in which the first port is hydraulically isolated from the second port and hydraulically connected to the third port.

5. A brake pressure control apparatus according to claim 2, wherein the first and second valve means are defined by a third electromagnetic change-over valve having a first port hydraulically connected to the pressure generating chamber, a second port hydraulically connected to the outlets of the third and fourth check valves and a third port hydraulically connected to the inlet passage of the pump, the third electromagnetic change-over valve being movable between a non-energized position in which the first port thereof is hydraulically isolated from the third port thereof and hydraulically connected to the second port thereof and an energized position in which the first port thereof is isolated from the second port thereof and hydraulically connected to the third port thereof.

6. A brake pressure control apparatus according to claim 3, wherein the first and second valve means are defined by a fourth electromagnetic change-over valve having a first port hydraulically connected to the pressure generating chamber, a second port hydraulically connected to the outlets of the third and fourth check valves and a third port hydraulically connected to the inlet passage of the pump, the fourth electromagnetic change-over valve being movable between a non-energized position in which the first port thereof is hydraulically isolated from the third port thereof and hydraulically connected to the second port thereof and an energized position in which the first port thereof is hydraulically isolated from the second port thereof and hydraulically connected to the third port thereof.

7. A brake pressure control apparatus according to claim 1, wherein the first valve means comprises a first normally open electromagnetic cut-off valve having a first port hydraulically connected to the pressure generating chamber and a second port hydraulically connected to the outlets of the third and fourth check valves, and the second valve means comprises a second normally closed electromagnetic cut-off valve having a first port hydraulically connected to the pressure generating chamber and a second port hydraulically connected to the inlet passage of the pump.

8. A brake pressure control apparatus according to claim 2, wherein the first valve means comprises a second normally open electromagnetic cut-off valve having a first port hydraulically connected to the pressure generating chamber and a second port hydraulically connected to the outlets of the third and fourth check valves, and the second valve means comprises a third normally closed electromagnetic cut-off valve having a first port hydraulically connected to the pressure generating chamber and a second port hydraulically connected to the inlet passage of the pump.

9. A brake pressure control apparatus according to claim 1, including a relief valve having an inlet hydraulically connected to the first and second outlet passages of the pump and an outlet hydraulically connected to the low back pressure reservoir.

* * * * *